US007933132B2

(12) United States Patent
Bridge et al.

(10) Patent No.: US 7,933,132 B2
(45) Date of Patent: Apr. 26, 2011

(54) SYNCHRONIZING FREQUENCY AND PHASE OF MULTIPLE VARIABLE FREQUENCY POWER CONVERTERS

(75) Inventors: Christopher D. Bridge, Bedford, NH (US); Laszlo Balogh, Merrimack, NH (US)

(73) Assignee: Fairchild Semiconductor Corporation, South Portland, ME (US)

( * ) Notice: Subject to any disclaimer, the term of this patent is extended or adjusted under 35 U.S.C. 154(b) by 228 days.

(21) Appl. No.: 12/361,419

(22) Filed: Jan. 28, 2009

(65) Prior Publication Data

US 2009/0267658 A1  Oct. 29, 2009

Related U.S. Application Data

(60) Provisional application No. 61/125,793, filed on Apr. 29, 2008.

(51) Int. Cl.
*H02M 7/00* (2006.01)
(52) U.S. Cl. ............................................. 363/65; 363/9
(58) Field of Classification Search ........... 363/9, 65–72
See application file for complete search history.

(56) References Cited

U.S. PATENT DOCUMENTS

| 5,193,054 | A | * | 3/1993 | Galloway et al. ............... 363/72 |
| 5,793,191 | A | | 8/1998 | Elmore et al. |
| 5,905,369 | A | | 5/1999 | Ishii et al. |
| 7,701,730 | B2 | * | 4/2010 | Cohen et al. ...................... 363/9 |
| 7,706,151 | B2 | * | 4/2010 | Neidorff et al. ................... 363/9 |

* cited by examiner

*Primary Examiner* — Jessica Han
(74) *Attorney, Agent, or Firm* — Sidley Austin LLP

(57) ABSTRACT

In an embodiment, a power converter system includes a plurality of variable frequency power converters and a plurality of synchronization circuits. Each variable frequency power converter has a switching frequency. Each synchronization circuit is associated with a respective one of the plurality of variable frequency power converters. A control circuit is coupled to and coordinates the plurality of synchronization circuits. The plurality of synchronization circuits and the control circuit are operable to synchronize the switching frequencies of the variable frequency power converters to each other. Each synchronization circuit is operable to: receive a first input signal indicative of the beginning of a switching period for the associated variable frequency power converter; receive a second input signal indicative of the end of the switching period for the associated variable frequency power converter; generate a first output signal for directing a pulse width modulation of the associated variable frequency power converter; and generate a second output signal for coordinating a phase relationship with another variable frequency power converter in the system.

14 Claims, 7 Drawing Sheets

SYNCHRONIZING FREQUENCY AND PHASE OF MULTIPLE VARIABLE FREQUENCY POWER CONVERTERS

BACKGROUND

1. Field of Invention

The present invention relates to power conversion, and more particularly, to synchronizing frequency and phase of multiple variable frequency power converters.

2. Description of Related Art

Power converters are essential for many modern electronic devices. Among other capabilities, a power converter can adjust voltage level downward (buck converter and its derivatives) or adjust voltage level upward (boost converter and its derivatives). A power converter may also convert from alternating current (AC) power to direct current (DC) power, or vice versa. A power converter may also function to provide an output at a regulated level (e.g., 5.0V). Power converters are typically implemented using one or more switching devices, such as transistors, which are turned on and off to deliver power to the output of the converter. Control circuitry is provided to regulate the turning on and off of the switching devices, and thus, these converters are known as "switching regulators" or "switching converters." Such a power converter may be incorporated into or used to implement a power supply—i.e., a switching mode power supply (SMPS). The power converters may also include one or more capacitors or inductors for alternately storing and outputting energy.

In some switching power converters, the frequency at which the switching devices are turned on and off may vary. Such power converters are known as variable frequency power converters and can include, for example, boundary conduction mode (BCM) power factor correction (PFC), quasi-resonant flyback converters, resonant converters, etc. Variable frequency power converters operate at their natural frequencies, which can depend on or be defined by their component values and operating conditions. Because most components are made to tolerances (i.e., a range of variation), the natural frequencies of variable frequency power converters (even of the same design) can be different, thus making it difficult to synchronize them.

Variable frequency power converters can have three time domain functions—synchronization, maximum frequency limit, and minimum frequency limit. The three time domain functions are usually implemented by independent time bases—i.e., each has its own timer or oscillator with its respective tolerances—making synchronization even more difficult when the converter is not in normal operation (i.e., in either frequency limit). In analog implementations, one problem is that the maximum frequency limit requires a short timer; the minimum frequency limit requires a long timer; and synchronization must work over a wide frequency range since synchronized operation is required at all times. The matching of these various timers, if implemented in analog circuitry, is very difficult.

SUMMARY

In one embodiment of the present invention, an integrated time-base is used in which the three time domain functions (i.e., synchronization, maximum frequency limit, and minimum frequency limit) are inherently matched over a wide frequency range. In such embodiment, there is no limit as the maximum frequency range.

According to an embodiment of the present invention, a power converter system includes a plurality of variable frequency power converters and a plurality of synchronization circuits. Each variable frequency power converter has a switching frequency. Each synchronization circuit is associated with a respective one of the plurality of variable frequency power converters. A control circuit is coupled to and coordinates the plurality of synchronization circuits. The plurality of synchronization circuits and the control circuit are operable to synchronize the switching frequencies of the variable frequency power converters to each other. Each synchronization circuit is operable to: receive a first input signal indicative of the beginning of a switching period for the associated variable frequency power converter; receive a second input signal indicative of the end of the switching period for the associated variable frequency power converter; generate a first output signal for directing a pulse width modulation of the associated variable frequency power converter; and generate a second output signal for coordinating a phase relationship with another variable frequency power converter in the system.

According to another embodiment of the present invention, a power converter system includes first through Nth variable frequency power converters. Each variable frequency power converter has a switching frequency. First through Nth synchronization circuits are coupled in a daisy-chain loop configuration. Each synchronization circuit is associated with a respective one of the first through Nth variable frequency power converters. The first through Nth synchronization circuits are operable to support the synchronizing of the switching frequencies of the first through Nth variable frequency power converters to each other. Each first through Nth synchronization circuit is operable to: receive a Begin Period input signal indicative of the beginning of a switching period for the associated variable frequency power converter; receive an End Period input signal indicative of the end of the switching period for the associated variable frequency power converter; generate a Start PWM output signal for directing a pulse width modulation of the associated variable frequency power converter; and receive a Sync In input signal and generate a Sync Out output signal for coordinating phase relationships with other variable frequency power converters in the system.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Embodiments of the present invention and their advantages are best understood by referring to FIGS. 1-7 of the drawings. Like numerals are used for like and corresponding parts of the various drawings.

Figure 1:
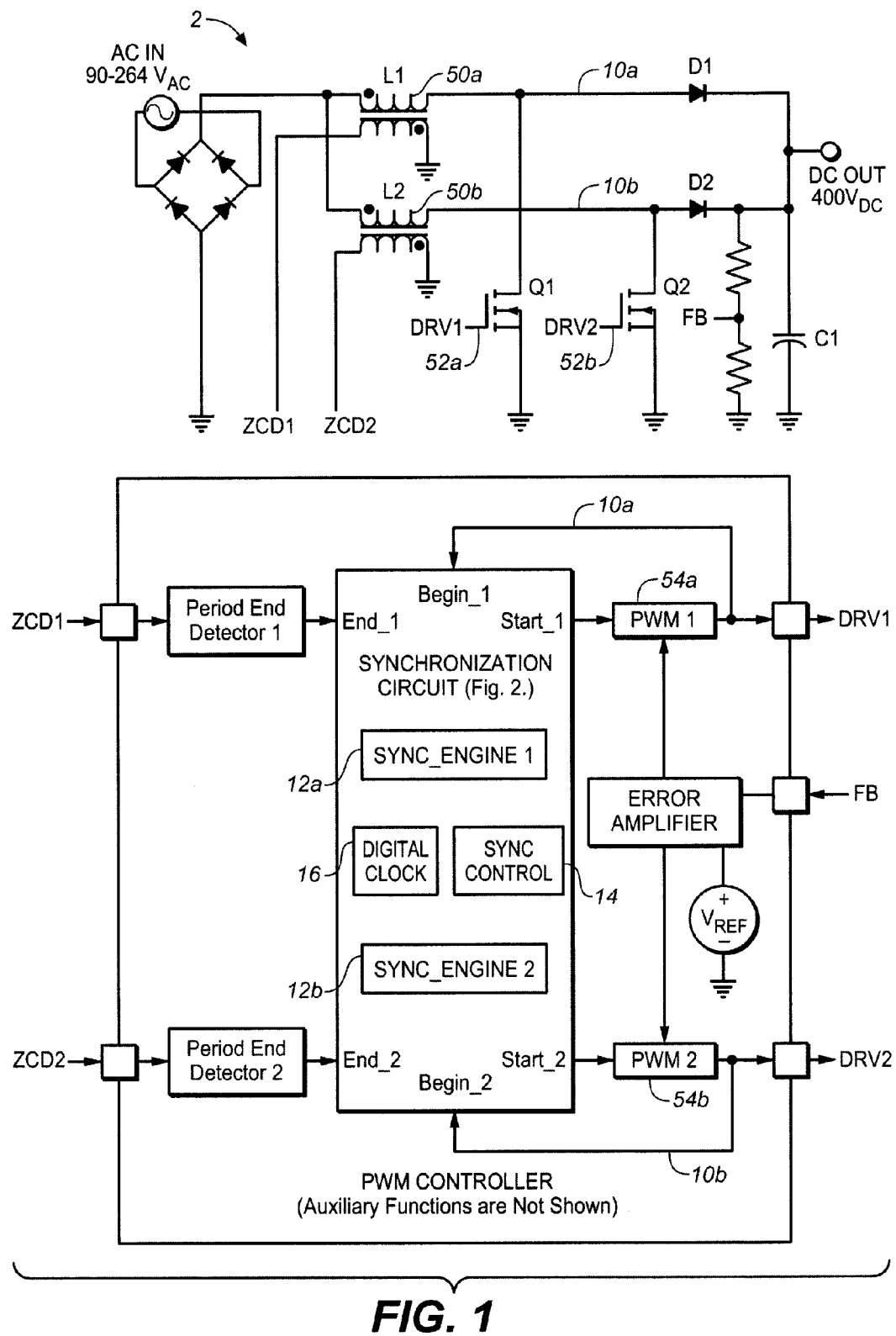
FIG. 1 illustrates a system having plurality of variable frequency power converters which can be synchronized with circuitry and methods, according to embodiments of the invention.

FIG. 1 illustrates a system 2 having a plurality of variable frequency power converters 10 (separately labeled 10a and 10b) which can be synchronized with circuitry and methods, according to embodiments of the invention.

As shown, each power converter 10 may include an inductor 50, a switching device 52, and drive circuitry (including a pulse width modulator (PWM) 54). Each power converter 10 can be a switching converter in which the frequency at which the respective switching devices 52 are turned on and off may vary, such as, for example, a boundary conduction mode (BCM) power factor correction (PFC), a quasi-resonant flyback converter, or a resonant converter. As shown, each variable frequency power converter 10 is a BCM PFC converter. In the BCM converters, the inductor current is allowed to return to zero before the switching device 52 is turned on, making it a variable-frequency scheme.

According to embodiments of the present invention, each variable frequency power converter 10 can be provided with a respective synchronization circuitry 12 (separately labeled 12a, 12b). Two converters 10 are present in the embodiment shown in FIG. 1, but in other embodiments, three or more converters 10 may be present. A controller 14 is coupled to each of the power converters 10 and coordinates the synchronization circuitry 12. As used herein, the terms or "connected" or "coupled," or any variant thereof, covers any connection or coupling, either direct or indirect, between two or more elements. The controller 14 may also handle operating mode changes (as discussed herein). A digital clock 16 provides a high frequency (HF) clock signal, the frequency of which is generally much higher than the switching frequency of the power converters 10 in the system.

The synchronization circuitry 12 function to synchronize the switching frequencies of the variable frequency power converters 10 to each other. In other words, synchronization circuitry 12, working together, cause the power converters 10 to run at the same frequency with appropriate phase relationship between the power converters 10 (i.e., 180° out of phase for a system with two power converters 10, 120° out of phase for a system with three power converters 10, 90° out of phase for a system with four power converters 10, etc.). In addition, the synchronization circuitry 12 may provide frequency clamp and restart timer and functionality for each variable frequency power converter 10 while maintaining synchronization. Frequency clamp functionality is related to, and may define, the upper frequency limit. The restart timer functionality is related to, and may define, the lower frequency limit.

In some embodiments, all or a portion of the components of the system 2 shown in FIG. 1 can be implemented on a single or multiple semiconductor dies (commonly referred to as a "chip") or discrete components. Each die is a monolithic structure formed from, for example, silicon or other suitable material. For implementations using multiple dies or components, the dies and components can be assembled on a printed circuit board (PCB) having various traces for conveying signals there between. In one embodiment, for example, the PWMs 54 of power converters 10, the synchronization circuitry 12, and the controller 14 can be provided on a single chip or die, and other components (e.g., inductors 50) provided as discrete components. In other embodiments, the synchronization circuitry 12, the controller 14, and HF clock 16 can be implemented on one die, and portions of the power converters 10 can be implemented on one or more separate die.

Figure 2:
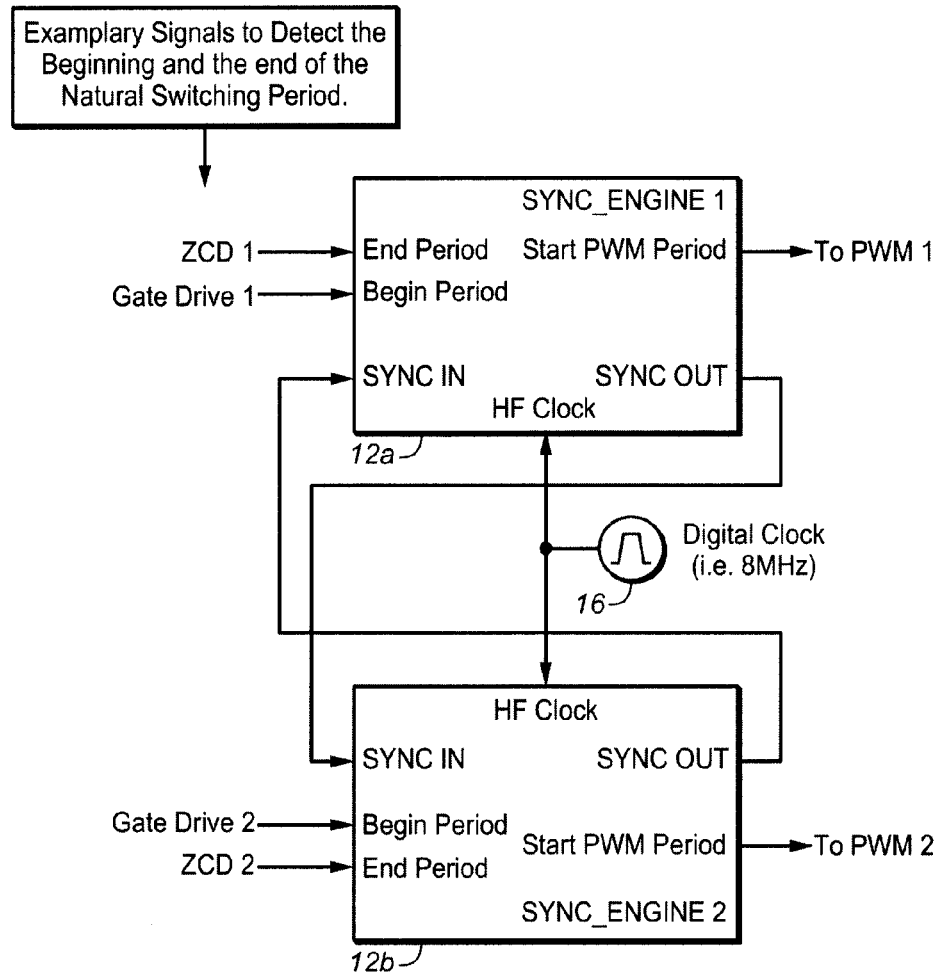
FIG. 2 is a schematic diagram in partial block form for two synchronization circuitry 12 for synchronizing two variable frequency power converters 10.

FIG. 2 is a schematic diagram in partial block form for two synchronization circuitry 12 for synchronizing two variable frequency power converters 10. In general, N number of synchronization circuitry 12 can be sequentially connected in a daisy-chained loop configuration to control N number of power converters 10 in the system. Each synchronization circuitry 12 may receive a control signal (SYNC_IN) from the previous synchronization circuitry 12 in the loop, and outputs its own control signal (SYNC_OUT) to the next synchronization circuitry 12 in the loop. The control signals carry or provide information relating to phase relationship for synchronizing the power converters 10. Each synchronization circuitry 12 may also output a control signal (Start PWM period) to the PWM 54 of its respective power converter 10; this control signal causes the PWM 54 to start the PWM period for the converter 10. Each synchronization circuitry 12 also receives an "END_PERIOD" signal (i.e., zero crossing detector (ZCD) signal in BCM PFC applications). The combination of the END_PERIOD signal and SYNC_IN signal may determine when the Start PWM period signal is generated.

Figure 3:
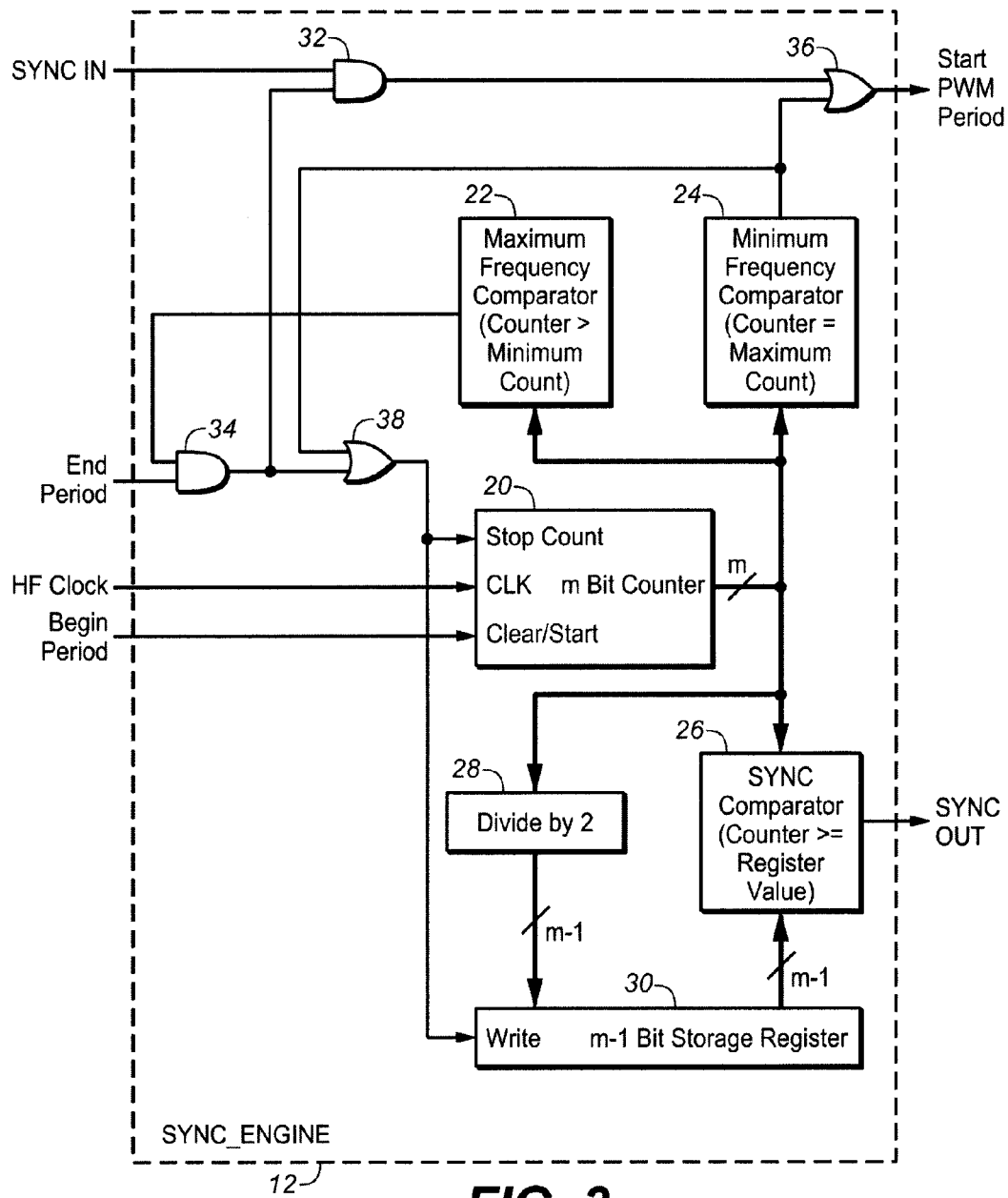
FIG. 3 is a schematic diagram in partial block form for an exemplary implementation of circuitry for synchronizing two variable frequency power converters, according to an embodiment of the invention.

FIG. 3 is a schematic diagram in partial block form for an exemplary implementation of synchronization circuitry 12 for synchronizing a plurality of variable frequency power converters (in this case two power converters), according to an embodiment of the invention. A separate synchronization circuitry 12 is provided for each power converter to be synchronized. Controller 14 coordinates the synchronization circuitry 12 with the synchronization circuitry for other power converters in the system having a plurality of power converters (see FIG. 1). The synchronization circuitry 12 measures the natural operating frequency of its respective variable frequency power converter, limits the maximum operating frequency, and ensures restart timer functionality for its respective converter.

For a system having N number of variable frequency power converters, N number of synchronization circuitry 12 can be used in a daisy-chained loop configuration to control N number of converters in the system. Each synchronization circuitry 12 receives a synchronization in (SYNC_IN) signal from the previous synchronization circuitry 12 and creates a synchronization out (SYNC_OUT) signal to the next synchronization circuitry 12 with the necessary phase relationship.

The synchronization circuitry 12 receives as input the HF Clock signal (from controller 14), a synchronization in (SYNC_IN) signal, a Begin Period signal, and an End Period signal. The synchronization circuitry 12 generates and outputs a synchronization out (SYNC_OUT) signal, and a start pulse width modulation period (Start PWM Period) signal. The SYNC_IN signal provides correct phase information from a previous synchronization circuitry 12 in the chain. The Begin Period signal is generated by a sense circuit in response to the detection of the beginning of a switching period for the respective power converter 10. The End Period signal is also generated by a sense circuit in response to the detection of the end of the power converter's natural switching period. In some power converters, the End Period signal may indicate that the inductor of the power converter has returned to zero current (zero energy stored). The SYNC_OUT signal provides information for the correct phase to the next power converter's synchronization circuitry 12. The Start PWM Period signal is a control signal to direct the pulse width modulator (PWM) of the corresponding power converter 10 to turn on the power switch. The PWM of the power converter 10 dictates or controls how long the switching device in the respective converter 10 is turned on.

As shown, in one embodiment, synchronization circuitry 12 includes a m-bit counter 20, a frequency clamp (or maximum frequency) comparator circuit 22, a re-start time (or minimum frequency) comparator circuit 24, a synchronization (sync) comparator circuit 26, a divider circuit 28, a storage register 30, AND gates 32, 34, and OR gates 36, 38. In some embodiments, all or a portion of the components of synchronization circuitry 12 can be implemented on a single or multiple semiconductor dies (commonly referred to as a "chip") or discrete components. Each die is a monolithic structure formed from, for example, silicon or other suitable material.

The m-bit counter 20, using the HF clock, Begin Period, and End Period input signals, measures the natural switching frequency of the respective power converter 10 in the form of number of HF clock cycles from the beginning of the period until the end of the period. Thus, the m-bit counter 20 converts the switching period into an integer binary number. The maximum frequency comparator circuit 22 stores the number representing the length of the minimum switching period in HF clock cycles and compares it to the actual counter value from the m-bit counter 20. If the counter value is less than the stored value, the clamp comparator circuit 20 outputs a value (e.g., 0) which effectively blocks the End Period signal. The minimum frequency comparator circuit 24 stores the number representing the length of the maximum switching period in HF clock cycles and compares it to the actual counter value from the m-bit counter 20. When the counter value equals the stored value, minimum frequency comparator circuit 24 outputs a signal to start a new PWM cycle independently from the other inputs. The minimum frequency comparator 24 can also ensure the power converter does not enter an unrecoverable state if the End Period signal is absent. These operations of the synchronization circuitry 12 cause the switching frequency of power converter 10 to be accurately bounded between a minimum and maximum frequency. When operating at either the maximum or minimum frequency limit, the power converters 10 are being protected from abnormal operating conditions.

In other embodiments, synchronization circuitry 12 and controller 14 can perform some mathematical calculation on the periods of all the power converters 10. This calculation could include, but is not limited to, averaging, multiplication, division, taking the maximum or minimum of the periods, with the result being used to establish the switching frequency and appropriate phase relationship among power converters 10.

The divider circuit 28 calculates half of the natural switching period (for a system having two power converters 10) as measured by the m-bit counter 20. For a three power converter system, the divider circuit 28 would divide the longest period by three. The storage register 30 stores this value from the divider circuit 28 for the next period to determine the right phasing of the SYNC_OUT signal. The sync comparator circuit 26 compares the value stored in the storage register 30 to the actual value of the m-bit counter 20. When these values are equal, the sync comparator circuit 26 outputs the synchronization signal (SYNC_OUT) the next power converter's synchronization circuitry 12. These operations of the synchronization circuitry 12 provide or support the appropriate phase relationship between the respective power converter 10 and other power converters in the system, again as further shown and described with respect to FIG. 4.

In operation, the synchronization circuitry 12 for the variable frequency power converters 10 in the system cooperate or work in conjunction to synchronize the power converters 10 to each other. Each synchronization circuitry 12 automatically detects the switching period for its own power converter. In one embodiment, the longest switching period of any converter 10 in the system is used as the switching period for all power converters 10 in the system. In other embodiment, the switching period/frequency for the power converters 10 can be derived by or determined by other suitable calculations (e.g., averaging, multiplication, or division). The system maintains equal on-time for the switching devices in all of the power converters 10. Synchronization circuitry 12 cause the power converters 10 to run at the same frequency by adjusting the off times of the power converters 10.

The synchronization circuitry 12 can modulate the off-time of the faster power converter 10 in the system to establish the same switching frequency and the required phase relationship between the converters 10. In general, only the slowest converter 10 in the system will run at its own switching frequency; all of the other converters—i.e., the faster ones—will be slowed down by extending their respective off-times. For a system having only two power converters 10, the synchronization circuitry 12 achieves 180° out-of-phase operation between the converters, This technique requires a slower digital clock than a system having three or more power converters because the two-converter system is less sensitive to the resolution determined by the digital clock period.

In one embodiment, among the various synchronization circuitry 12, there is no dedicated master-slave arrangement. This feature or property provides a technical advantage in volume manufacturing, because there is no issue with component tolerances, especially changes in the on-time of the individual power converters. If one power converter 10 has a longer on-time, the switching frequency will be slower than the other converter, and the slower converter will force its switching frequency on the other converter, and vice versa.

The synchronization circuitry 12 not only provides or functions to synchronize its respective power converter 10 with the other power converters 10, but the synchronization circuitry 12 also limits the minimum and maximum switching frequency, simplifying the design of the rest of the controller.

The synchronization circuitry 12 and corresponding methods work with both analog and digital pulse width modulators. Digital pulse width modulators may have improved performance since they can match the on-times of the switches 52 of the converters better than analog versions.

Thus, as described herein, circuitry and methods, according to embodiments of the present invention, use one timebase and one unified circuit for all three time domain functions—synchronization, frequency clamp, and restart timer. The circuitry and methods solve the fundamental synchronization problem, and maintain the synchronization of multiple variable frequency power converters, even when in the protected modes of operation, such as minimum and maximum frequency limit.

Furthermore, the circuitry and methods, according to embodiments of the present invention, solve or mitigate stability issues associated with the other techniques modulating the on-times of the power switches by modulating the off-times of the power switches instead.

The circuit is free of relatively long settling times while synchronous operation can not be ensured (typical of simple analog circuits or phase locked loop (PLL) based techniques used in traditional approaches). The circuitry and methods support or provide proper synchronization operation in a single PWM switching cycle. The circuitry and methods are not constrained by a predetermined master-slave requirements.

Because of the extremely fast settling time, the implementations described herein are well suited for applications where one of the two (or n−1 of n) power converters 10 might be disabled at light load or to achieve a certain electromagnetic interference (EMI) signature or to improve overall efficiency. Since the synchronization circuitry 12 and controller 14 acquire the right phase relationship in one switching cycle, a power converter 10 can be readily added to or removed from the system while synchronization is maintained. Thus, the addition or subtraction of one or more power converters (known as "phase shedding" or "phase management") is straightforward.

Figure 4:
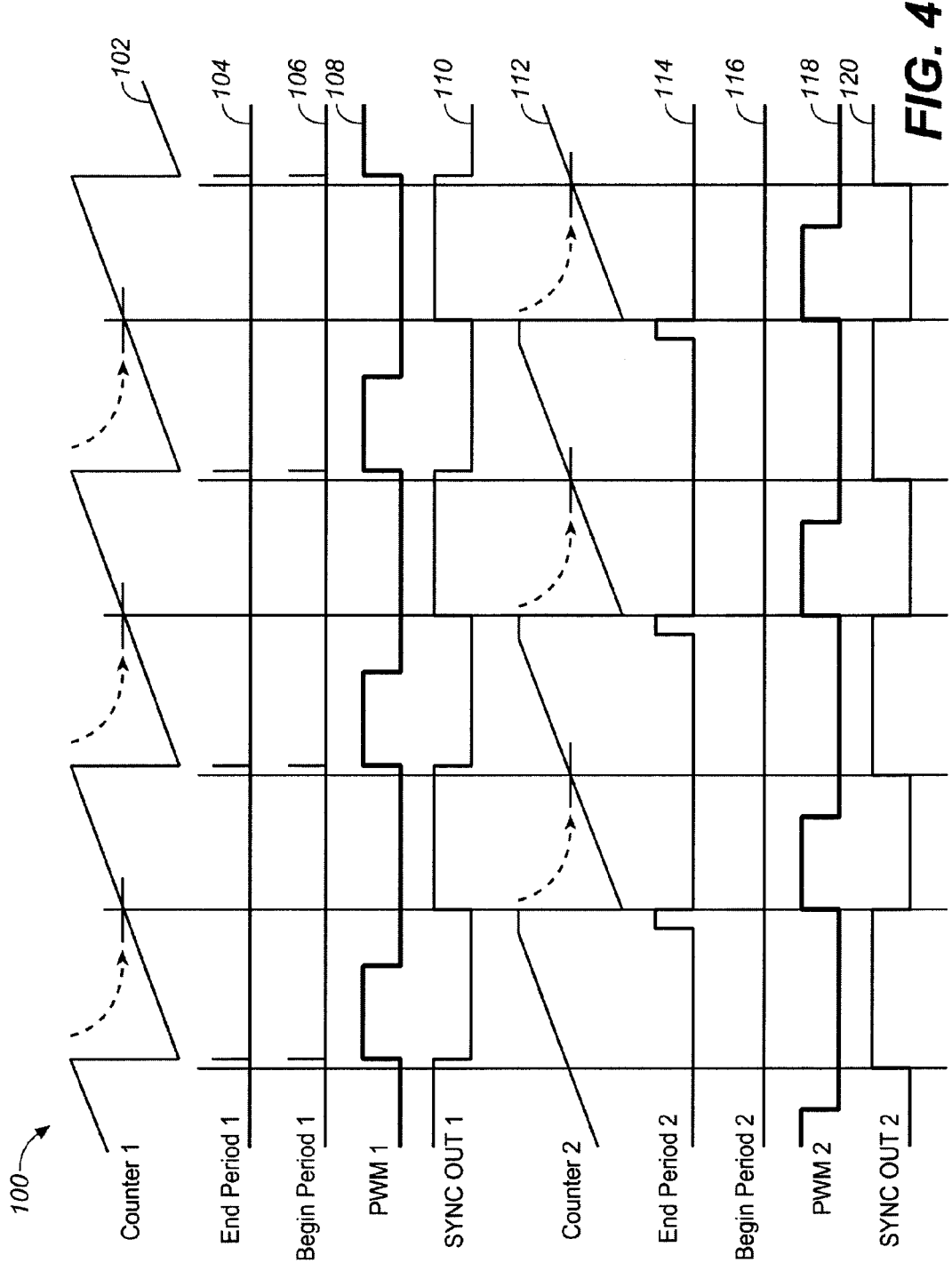
FIG. 4 is an exemplary waveform diagram for synchronization for the power converters illustrated in FIG. 1, according to an embodiment of the invention.

FIG. 4 is an exemplary waveform diagram 100 for synchronization, according to an embodiment of the invention. The waveform diagram 100 includes waveforms which, in one embodiment, can be for signals in a system with two variable frequency power converters 10, each having its own respective synchronization circuitry 12 (such as power converters 10a and 10b shown in FIG. 1).

As depicted, these waveforms include, for the first converter 10a, waveform 102 (Counter 1), an analog representation of the digital counting by counter 20 of converter 10a; waveform 104 (End Period 1) representing the End Period signal for converter 10a; waveform 106 (Begin Period 1) representing the Begin Period signal for converter 10a; waveform 108 (PWM 1) representing the PWM signal for converter 10a; and waveform 110 (SYNC_OUT 1) representing the SYNC_OUT signal for converter 10a.

For the other converter 10b in the system, diagram 100 has waveform 112 (Counter 2), an analog representation of the digital counting by counter 20 of converter 10b; waveform 114 (End Period 2) representing the End Period signal for converter 10b; waveform 116 (Begin Period 2) representing the Begin Period signal for converter 10b; waveform 118 (PWM 2) representing the PWM signal for converter 10b; and waveform 120 (SYNC_OUT 2) representing the SYNC_OUT signal for converter 10b.

As shown in FIG. 4, power converter 10b would run faster than power converter 10a, as indicated by End Period 2 signal of waveform 116 compared to End Period 1 signal of waveform 106. The pulses for End Period 2 signal for converter 10b actually begin before the halfway point of the counter 1 signal for converter 10a. The synchronization circuitry 12 of the power converters 10a and 10b use the natural switching frequency of power converter 10a as the frequency for the system. This is accomplished by delaying the PWM 2 signal of power converter 10b so that it begins at the halfway point of the counter 1 signal for converter 10a, rather than sooner (i.e., at the beginning of the pulses for End Period 2 signal).

Also, the synchronization circuitry 12 of the power converters 10a and 10b maintain an appropriate phase relationship between the power converters 10a and 10b—there is 180° phase shift between PWM 1 signal for power converter 10a and PWM2 signal for power converter 10b.

Figure 5:
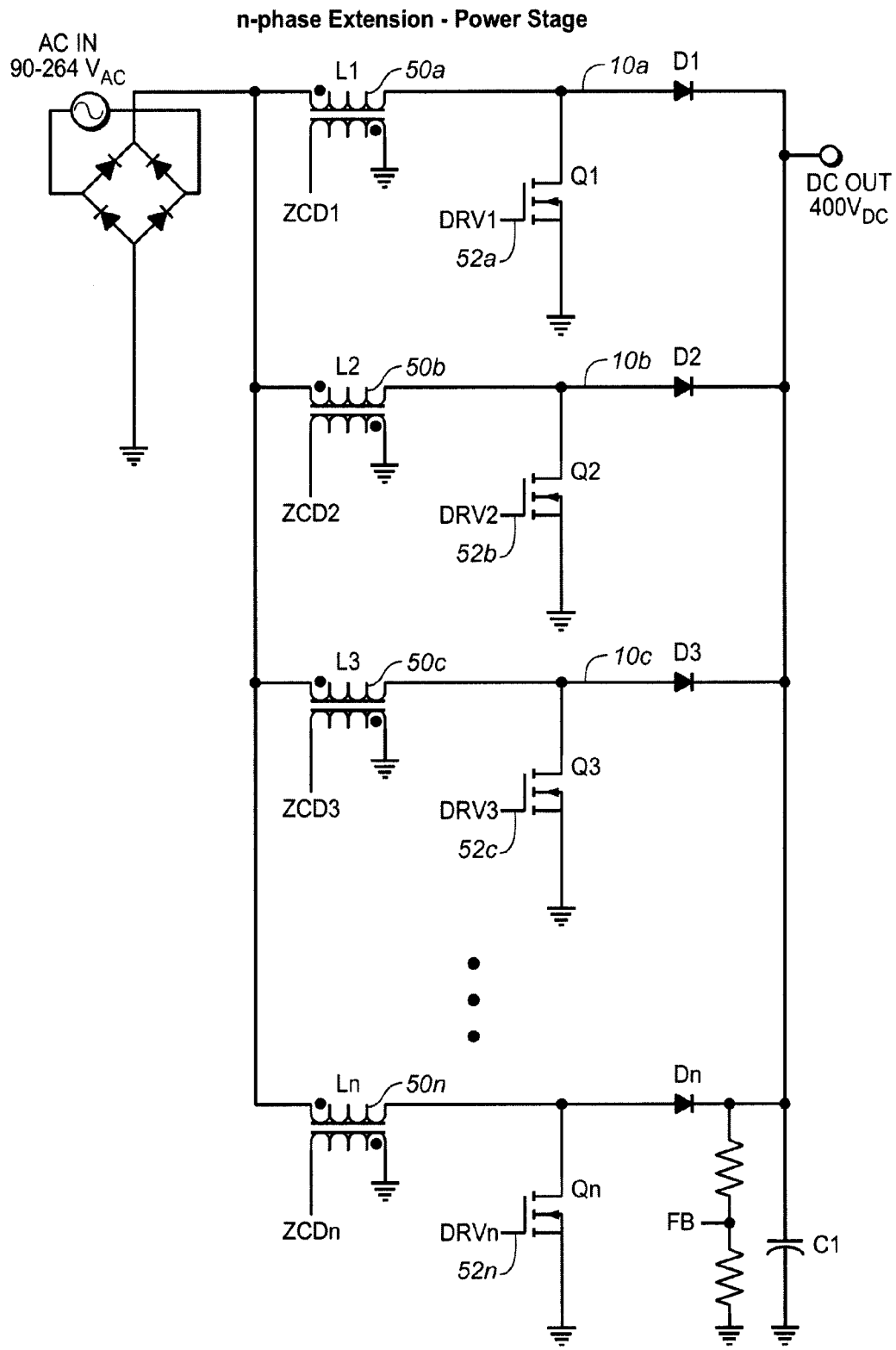
FIG. 5 illustrates a plurality of variable frequency power converters which can be synchronized with circuitry and methods, according to embodiments of the invention.

FIG. 5 illustrates a plurality of variable frequency power converters 10 (separately labeled 10a, 10b, 10c, . . . 10n) which can be synchronized with circuitry and methods, according to embodiments of the invention. Each power converter 10 can be a switching converter in which the frequency at which the respective switching devices are turned on and off may vary, such as, for example, a boundary conduction mode (BCM) power factor correction (PFC), a quasi-resonant flyback converter, or a resonant converter. In this embodiment, three or more variable frequency power converters 10 may be present. The circuitry and operation of the multiple power converter system shown in FIG. 5 are substantially similar to that for the two power converter system shown in FIG. 1.

Figure 6:
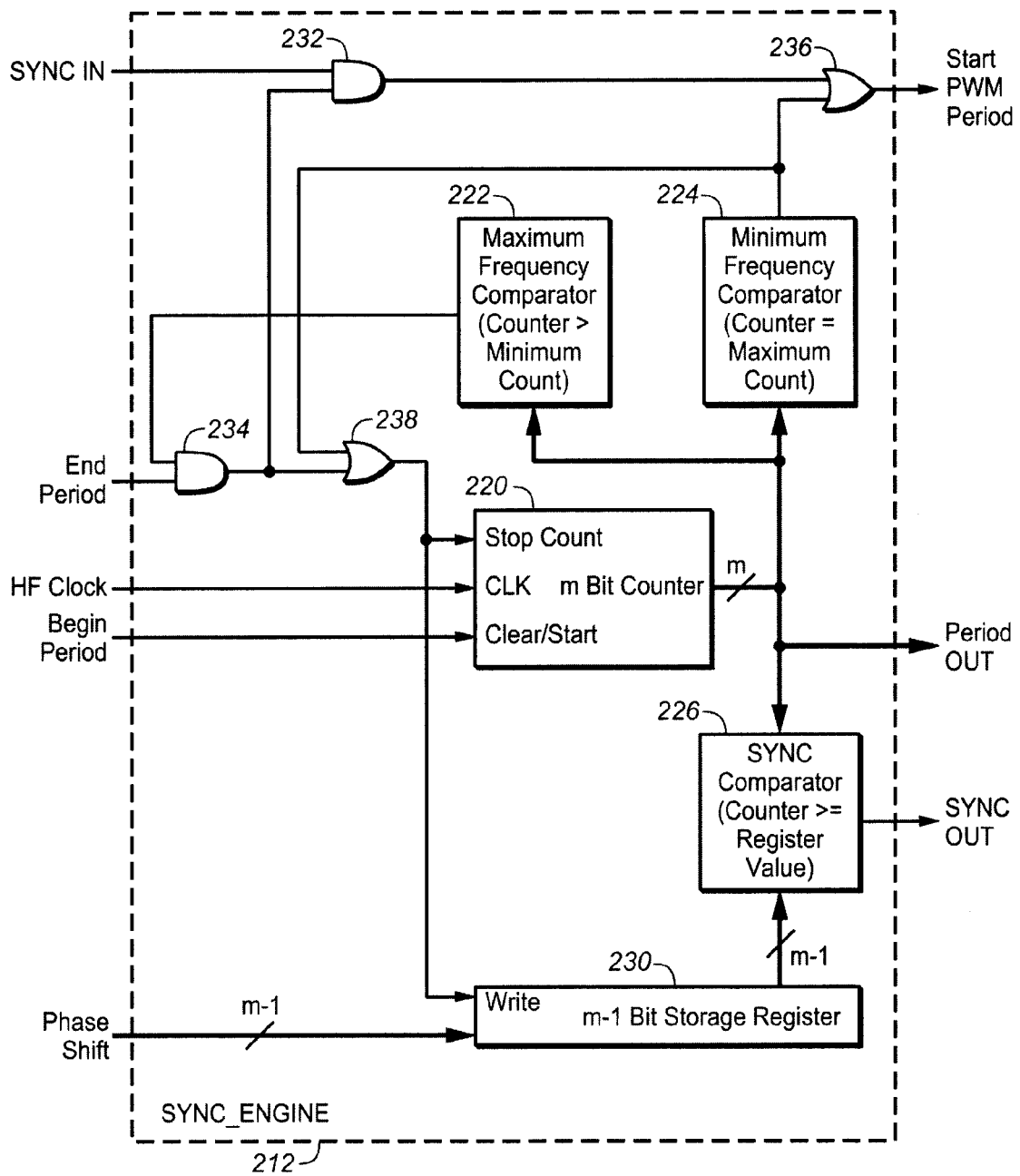
FIG. 6 is a schematic diagram in partial block form for an exemplary implementation of circuitry for synchronizing a plurality of variable frequency power converters, according to an embodiment of the invention.

FIG. 6 is a schematic diagram in partial block form for an exemplary implementation of synchronization circuitry 212 for synchronizing three or more variable frequency power converters, according to an embodiment of the invention. The synchronization circuitry 212 shown in FIG. 6 is substantially similar in structure and operation to that of the two-power converter synchronization circuitry shown in and described with reference to FIG. 3.

As shown, in one embodiment, synchronization circuitry 212 includes a m-bit counter 220, a frequency clamp-comparator circuit 222, a re-start time (or minimum frequency) comparator circuit 224, a synchronization (sync) comparator circuit 226, a storage register 230, AND gates 232, 234, and OR gates 236, 238.

Figure 7:
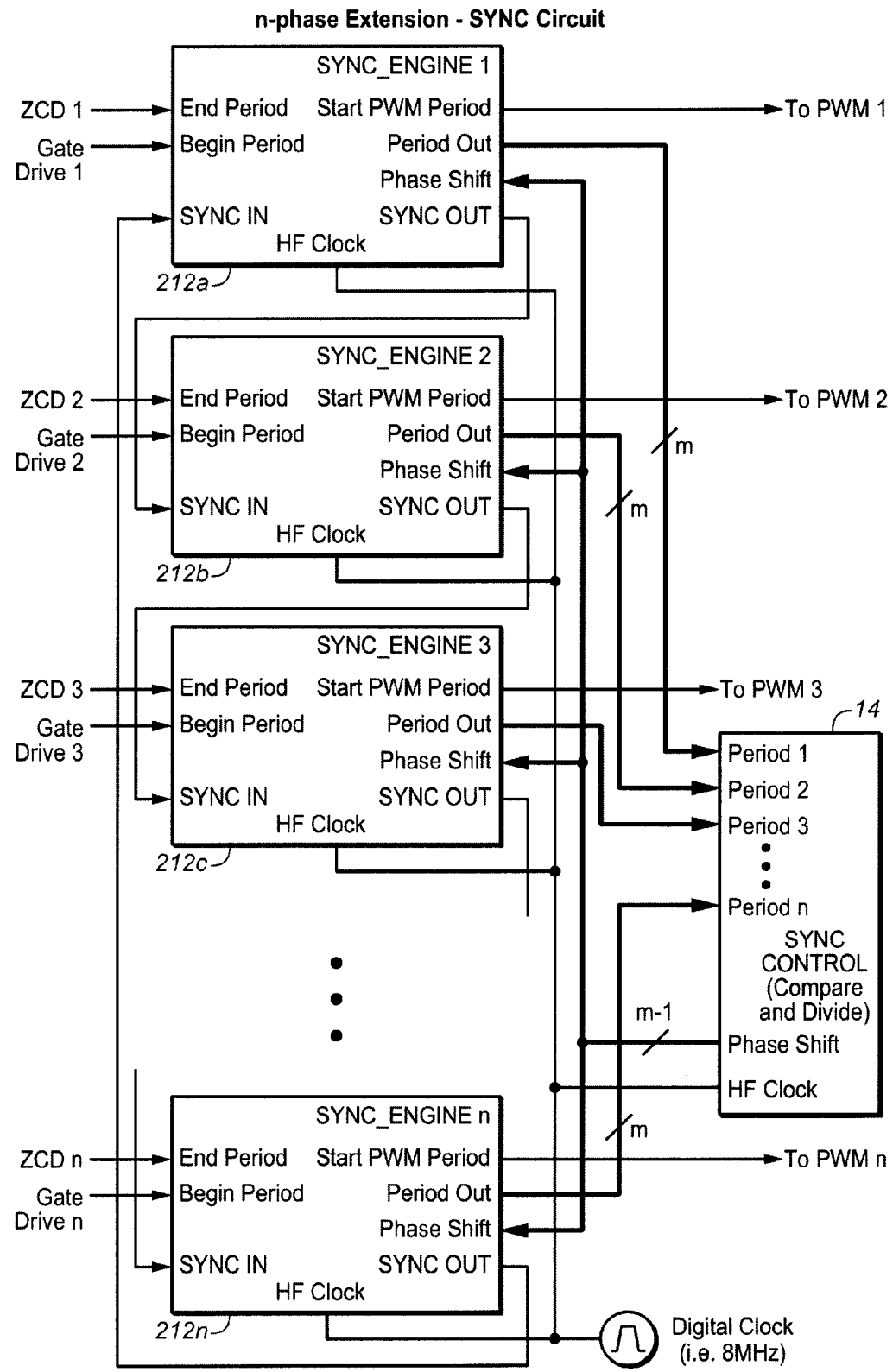
FIG. 7 is a schematic diagram in partial block form for an exemplary implementation of circuitry for synchronizing a plurality of variable frequency power converters, according to an embodiment of the invention.

As shown in FIG. 7, in a system with three or more variable frequency power converters 10, each variable frequency power converter 10a, 10b, 10c, . . . 10n can be provided with a respective synchronization circuitry 212 (separately labeled 212a, 212b, 212c, . . . 212n). The synchronization circuitry (212) reports the measured period at digital port named Period Out to the control circuit 14. The control circuit 14 reads and stores the period information for each individual power converter 10. Control circuit 14 then determines the exact phase shift required to synchronize the converters 10. In the simplest case, in one embodiment the controller 14 chooses the maximum period reported from the individual synchronization circuits (212) and divides by the number of n, the number of phases. The required phase shift is output on the Phase Shift output. Each synchronization circuit (212) uses the Phase Shift to produce a synchronization output (SYNC_OUT) for the next synchronization circuit (212) in the daisy chain system shown in FIG. 7. A controller 14 coordinates the synchronization circuitry in the system. The controller 14 and synchronization circuitry 212a, 212b, 212c, . . . 212n cooperate to synchronize of the variable frequency power converters 10a, 10b, 10c, . . . 10n to each other so that the power converters 10 run at the same frequency with appropriate phase relationship among them (i.e., 360°/n out of phase ).

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A power converter system comprising:
a plurality of variable frequency power converters, each variable frequency power converter having a switching frequency;
a plurality of synchronization circuits, each synchronization circuit associated with a respective one of the plurality of variable frequency power converters; and
a control circuit coupled to and coordinating the plurality of synchronization circuits;
wherein the plurality of synchronization circuits and the control circuit are operable to synchronize the switching frequencies of the variable frequency power converters to each other;
wherein each synchronization circuit is operable to:
receive a first input signal indicative of the beginning of a switching period for the associated variable frequency power converter;
receive a second input signal indicative of the end of the switching period for the associated variable frequency power converter;
generate a first output signal for directing a pulse width modulation of the associated variable frequency power converter; and
generate a second output signal for coordinating a phase relationship with another variable frequency power converter in the system.

2. The power converter system of claim 1 wherein each variable frequency power converter comprises a switching device operable to be turned on and off for delivering power at a load.

3. The power converter system of claim 1 wherein for at least some of the plurality of synchronization circuits the first output signal is generated in response to the first input signal indicative of the beginning of a switching period for the associated variable frequency power converter and one of the second output signals generated by another synchronization circuit.

4. The power converter system of claim 1 wherein the plurality of synchronization circuits are coupled in a daisy-chain loop configuration.

5. The power converter system of claim 4 wherein each of the plurality of synchronization circuits receives the second output signal generated by another one of the synchronization circuits in the daisy-chain loop configuration.

6. The power converter system of claim 1 wherein each synchronization circuit is operable to measure a natural switching frequency of the associated variable frequency power converter.

7. The power converter system of claim 1 wherein the longest switching period of any of the plurality of variable frequency power converters in the system is used as the switching period for all of the variable frequency power converters.

8. The power converter system of claim 1 wherein the plurality of synchronization circuits and the control circuit are operable to calculate a switching period to be used by all of the variable frequency power converters.

9. A power converter system comprising:
first through Nth variable frequency power converters, each variable frequency power converter having a switching frequency; and
first through Nth synchronization circuits coupled in a daisy-chain loop configuration, each synchronization circuit associated with a respective one of the first through Nth variable frequency power converters;
wherein the first through Nth synchronization circuits are operable to support the synchronizing of the switching frequencies of the first through Nth variable frequency power converters to each other;
wherein each first through Nth synchronization circuit is operable to:
receive a Begin Period input signal indicative of the beginning of a switching period for the associated variable frequency power converter;
receive an End Period input signal indicative of the end of the switching period for the associated variable frequency power converter;
generate a Start PWM output signal for directing a pulse width modulation of the associated variable frequency power converter; and
receive a Sync In input signal and generate a Sync Out output signal for coordinating phase relationships with other variable frequency power converters in the system.

10. The power converter system of claim 9 comprising a control circuit coupled to and coordinating the first through Nth synchronization circuits.

11. The power converter system of claim 10 wherein the first through Nth synchronization circuits and the control circuit are operable to calculate a switching period to be used by all of the variable frequency power converters in the system.

12. The power converter system of claim 9 wherein each of the first through Nth variable frequency power converters comprises a switching device operable to be turned on and off for delivering power at a load.

13. The power converter system of claim 9 wherein each of the first through Nth synchronization circuits is operable to measure a natural switching frequency of the associated variable frequency power converter.

14. The power converter system of claim 9 wherein the longest switching period of any of the first through Nth variable frequency power converters in the system is used as the switching period for all of the variable frequency power converters.

* * * * *